Aug. 4, 1942. W. ERNST Re. 22,152

METAL DRAWING PRESS

Original Filed Sept. 16, 1936

INVENTOR.
WALTER ERNST

BY Faulmin & Faulmin
ATTORNEYS.

Reissued Aug. 4, 1942 Re. 22,152

UNITED STATES PATENT OFFICE 22,152

METAL DRAWING PRESS

Walter Ernst, Mount Gilead, Ohio, assignor to The Hydraulic Development Corporation, Inc., Wilmington, Del., a corporation of Delaware Original No. 2,214,635, dated September 10, 1940, Serial No. 153,157, July 12, 1937, which is a division of Serial No. 101,110, September 16, 1936, now Patent No. 2,167,941, dated August 1, 1939. Application for reissue August 2, 1941, Serial No. 405,248

12 Claims. (Cl. 113—45)

This invention relates to presses and, in particular, to hydraulic presses having blankholding arrangements in association with drawing devices.

One object of this invention is to provide a hydraulic press having a drawing plunger and a plurality of clamping plungers, operating in drawing and clamping cylinders, respectively, the pressure for operating the clamping cylinders being provided by the action of the drawing plunger in forcing the clamping plungers downwardly against the blank, means being provided for releasing pressure fluid from the different clamping cylinders at different predetermined pressures so as to enable the blank to be held at different points by different clamping pressures.

Another object is to provide a hydraulic press having a drawing plunger and a plurality of clamping plungers arranged to provide different clamping pressures among themselves, together with release of pressure fluid therefrom on the attainment of different predetermined pressures therein, means being provided to prevent the escape of pressure fluid upon the return stroke of the drawing plunger when the pressure-releasing means is set at a low amount, thereby counteracting the effect of the pressure-releasing means during the return stroke of the press.

This is a division of my copending application, Ser. No. 101,110, filed September 16, 1936, now Patent 2,167,941, Aug. 1, 1939.

In general, the press of this invention consists of a drawing plunger and a plurality of clamping plungers having relief valves associated with each clamping plunger for release of the pressure fluid therein at predetermined pressures, thereby enabling the different clamping plungers to exert different clamping pressures upon the blank. There is also provided a series of check valves adapted to prevent the individual relief valves from interfering with the action of each other, thereby preventing equalization of pressure between the different clamping cylinders by the discharges from their relief valves. The arrangement of Figure 1 also contains a provision whereby the action of the various relief valves is prevented during the return stroke by admitting fluid to the opposite side of the valve plunger, this arrangement enabling the moving parts to return on the return stroke, regardless of how low the relief valve setting may be.

The reason for providing a different clamping pressure at different portions of the blank arises from the fact that it is found that in drawing irregular work pieces it is often desirable to hold one portion of the periphery of the blank with a tighter clamping force than other portions. In the ordinary types of presses, wherein the same clamping pressure is provided on all portions of the blank, this variable blank-holding force cannot be supplied. In the present invention, however, each individual clamping cylinder is equipped with its own relief valve and its own check valve so that a different clamping pressure can be built up on each one of the several clamping plungers.

Figure 1:
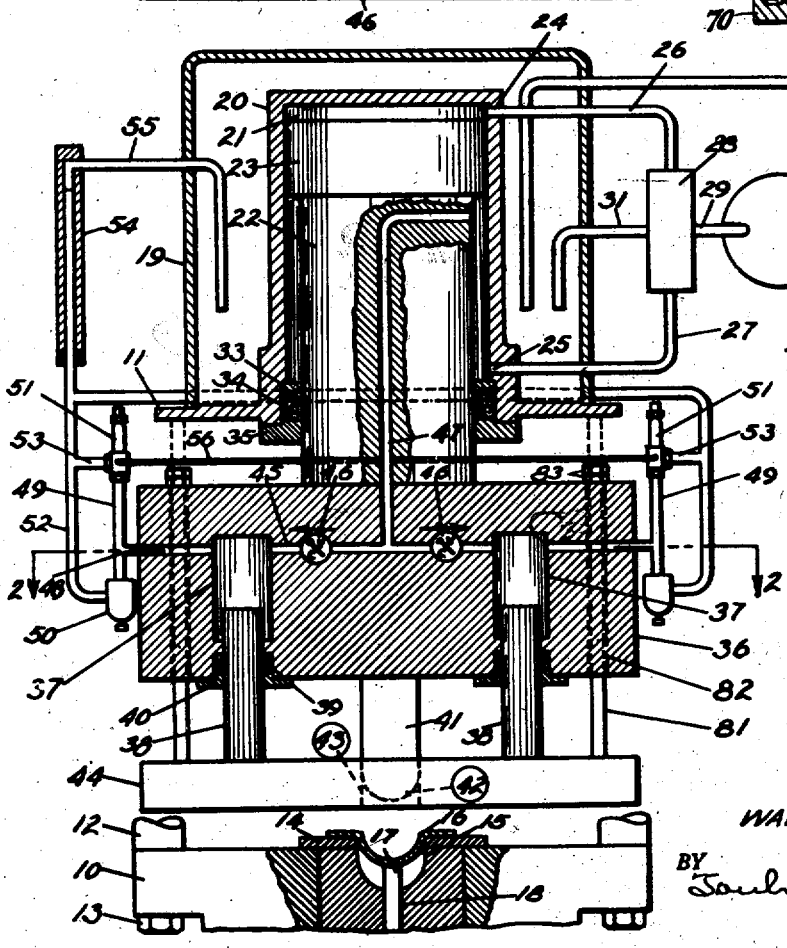
Figure 1 is a diagrammatic view, mainly in section, showing the working elements of a hydraulic press circuit arranged according to this invention, with the upper portion of the press framework omitted to show the construction more clearly.

Referring to the drawing in detail, Figure 1 shows diagrammatically a hydraulic metal drawing press having a base member 10 connected to a top member 11 (reduced in size for clearness of showing) by means of tie rods 12, the latter being secured in position by means of the nuts 13 upon the ends thereof. Mounted in the base member 10 is a drawing die 14 having a die cavity 15 for receiving the blank 16. Associated with the die cavity 15 is a plunger 17 adapted to support the tip of the blank as it is being drawn, and passing through a bore 18 to its operating cylinder (not shown). The details of the supporting plunger 17 form no part of the present invention, and are shown in my copending application, Ser. No. 74,742, filed April 16, 1936, which has matured to Patent No. 2,136,-240, issued November 8, 1938.

The present invention may be employed either with flat blanks or with blanks which have already been subjected to one or more drawing operations. For convenience of disclosure, blank 16 is shown as having been subjected to one drawing operation, and in position for another drawing operation, which will elongate it and cause it to be drawn downwardly into the die cavity 15.

Associated with the top member 11 of the press is a surge tank 19 for containing the fluid by which the press is actuated. Also associated with the top member 11 is the drawing or main cylinder 20, having a bore 21 within which reciprocates the double-acting drawing plunger 22 having a piston head 23 thereon. The cylinder 20 is provided with upper and lower ports 24 and 25 on opposite sides of the piston head 23, and adapted by means of pipes 26 and 27 to supply pressure fluid to advance or retract the drawing plunger 22, according to the manner in which the four-way valve 28 is manipulated. This valve 28 is of any suitable type known to those skilled in the art, and its details form no part of the present invention.

Leading from the four-way valve 28 is the pressure line 29 connected at its opposite end to the pump 30. A discharge line 31, also connected to the four-way valve 28, leads into the interior of the surge tank 19. The pump 30 is also provided with a suction line 32, likewise leading into the interior of the surge tank 19. The drawing cylinder 20 is supplied near the mouth of its bore 21 with a packing ring 33, beyond which is a packing 34 adapted to be compressed by a gland 35 so as to prevent leakage around the drawing plunger 22. Connected to the drawing plunger 22 is the platen 36, within which are arranged the clamping cylinders 37 having clamping plungers 38 operating therein. Each clamping plunger 38 is provided with a packing 39 and gland 40 for the prevention of leakage. Secured to the platen 36 is a drawing plunger or punch 41 having a nose portion 42 corresponding to the die cavity 15, and adapted to pass through an aperture 43 in the clamping member 44 secured to the outer ends of the clamping plungers 38.

Each of the clamping cylinders 37 is provided with a fluid passageway 45 leading by way of an outwardly opening check valve 46 to a common passageway 47, which extends upwardly through the drawing plunger 42 and opens into the drawing cylinder bore 21 immediately beneath the drawing plunger head 23. Consequently, fluid is free to pass from the pull-back or return side of the drawing plunger 23 into the clamping cylinders 37, but is prevented from passing in the opposite direction by the action of the check valves 46. Also passing outwardly from each clamping cylinder 37 is a fluid conduit 48 leading to an intermediate portion of a pipe 49, having on one end a safety valve 50 and on the other end a pressure relief valve 51. Leading from the discharge side of the safety valve 50 is a discharge line 52 connected to the discharge side of the relief valve 51 by the line 53.

The discharge line 52 passes upwardly into the telescopic cylinder 54, thereby forming a slip connection, enabling the telescoping cylinder 54 and the pipe 52 to move vertically relatively to each other, an action which necessarily occurs when the platen 36 moves downwardly in response to the action of the drawing plunger 22. A discharge line 55 leads from the telescoping cylinder 54 into the interior of the surge tank 19 and serves to discharge fluid expelled from the pressure relief valve 51 of the safety valve 50. The safety valve 50 is provided merely as an additional safety feature in the event of a jamming or other failure of the pressure relief valve 51, and is set at a higher pressure than the relief valve 51 so as to operate in case of the accumulation of a dangerous pressure within the corresponding clamping cylinder 37 and a failure of the corresponding pressure relief valve 51 to act. It will be seen from Figures 1 and 2 that each clamping cylinder is provided with its own pressure relief valve 51 and safety valve 50 so that a different pressure release point may be given to each clamping cylinder. The pressure relief valves 51 are connected to the drawing plunger passageway 47 by conduits 56 for the purpose of counteracting the action of the relief valves 51 during the return stroke of the drawing plunger 22, as is discussed below in connection with the description of the details of the relief valve 51.

Figure 3:
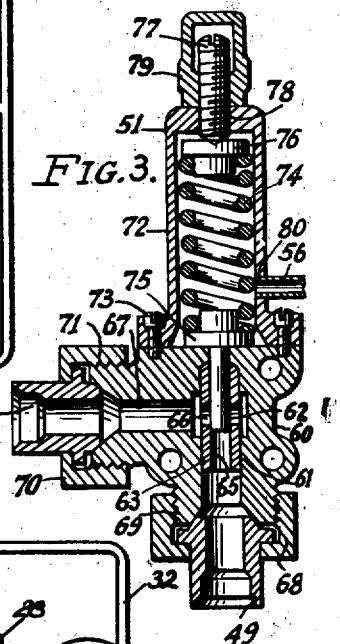
Figure 3 is a vertical section through a pressure relief valve employed in connection with the press circuit shown in Figure 1.

The relief valve 51 is shown in vertical section in Figure 3, and consists of a casing 60 having a bore 61 within which reciprocates a valve plunger 62. Arranged between the valve plunger 62 and the bore 61 is a tubular member 63 having a longitudinal bore 65 and a cross bore 66, communicating therewith and opening into a transverse bore 67 in the casing 60. The end connection of the pipe 49 is held in communication with the bore 61 by means of the collar 68 engaging the threaded portion 69 of the casing 60, whereas the end of the pipe 53 is similarly held in communication with the transverse bore 67 by means of the threaded collar 70 engaging the threaded portion 71 of the casing (Figure 3).

Mounted on the upper portion of the casing 60 is a tubular cap 72 secured thereto by screws 73. Within the cap 72 is a coil spring 74, one end of which engages an enlargement 75 upon the upper end of the valve plunger 62, whereas the opposite end engages a button 76 in contact with an adjusting screw 77 threaded through a bore 78 in the upper end of the cap 72. Surrounding and covering the adjusting screw 77 is a hollow nut 79 which serves to protect the adjusting screw 77 and also to lock it in its adjusted position. The cap 72 is provided with a port 80 receiving and communicating with the pipe 56 leading to the pull-back side of the drawing plunger 22, as shown in Figure 1.

Thus, when the same pressure fluid is admitted simultaneously to the valve 51, by way of the pipes 49 and 56 during the pull-back stroke of the press, the valve plunger 62 will be prevented from opening by means of this counteracting arrangement, as is more fully described under the operation thereof. The pipe 56 also serves during the return stroke of the press to receive and transmit the fluid which leaks into the interior of the cap 72 past the valve plunger 62. Thus, each safety valve 51 may be adjusted to discharge pressure fluid at a different predetermined pressure by differently adjusting the adjusting screw 77 to compress the springs 74 by different amounts. The clamping member 44 is provided with rods 81 passing through the vertical bores 82 in the platen 36, and having the nuts 83 on the upper ends thereof. The rods 81 limit the extent to which the clamping member 44 can move relatively to the platen 36.

Figure 2:
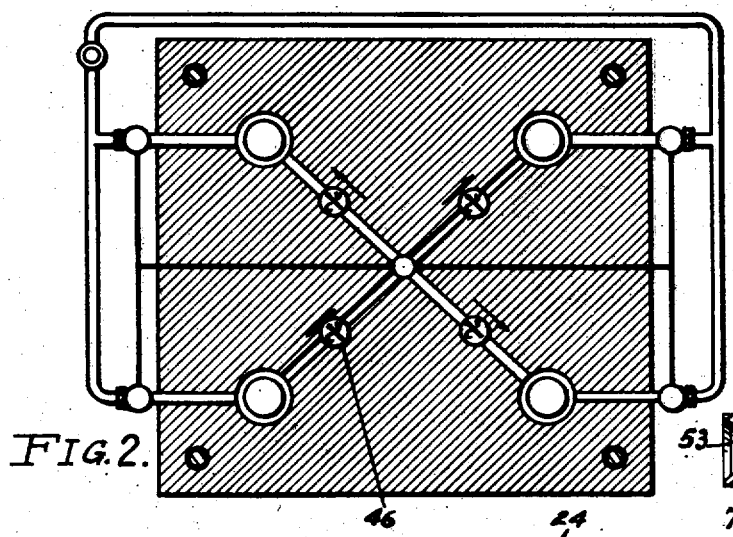
Figure 2 is a horizontal section along the line 2—2 in Figure 1.

In the operation of the form of press shown in Figures 1 and 2, the pump 30 is started and delivers pressure fluid to the four-way valve 28, which in turn, is set to deliver pressure fluid through the line 26 and port 24 into the space above the drawing plunger head 23. This pressure forces the drawing plunger 22 and platen 36 downwardly, carrying with them the clamping member 44. When the latter engages the periphery of the blank 16 and clamps it tightly against the die member 14, the clamping member 44 halts, but the platen 36 continues to move downwardly, forcing its drawing die or punch 41 into engagement with the blank 16. As the punch 41 moves downwardly it forces the central portion of the blank 16 into the die cavity 15 and overcomes the resistance of the supporting plunger 17, which protects the tip of the work piece or blank 16.

Meanwhile pressure has been built up in the clamping cylinders 37 by reason of the relative motion between the platen 36 and the clamping member 44 to which the clamping plungers 38 are attached, and the fluid in the clamping cylinders 37 has been prevented from escaping by the closing of the outwardly opening check valves 46. When the pressure within each clamping cylinder 37 reaches the amount for which its corresponding relief valve 51 is set, the latter opens and discharges fluid through the line 53, into the discharge line 52 leading to the telescoping cylinder 54, and thence by the line 55 to the surge tank 19. In this manner each clamping plunger 38 may be caused to exert a different force upon the portion of the blank periphery which is engaged by the clamping member 44 in its vicinity.

When the drawing stroke of the press has been completed the setting of the four-way valve 28 is reversed so that pressure fluid flows through the line 27 and port 25, into the space beneath the drawing plunger head 23, causing the drawing plunger 22 to move upwardly. A portion of this pressure fluid, however, passes downwardly through the plunger passageway 47, the outwardly opening relief valves 46, to the passageways 45, into the clamping cylinders 37, causing their plungers 38 and the clamping member 44 to remain in clamping engagement with the blank 16 while the punch or drawing die 41 is withdrawn from the cavity 15 of the die 14. If the relief valves 51 have been set for a low clamping pressure it would, at first glance, seem that pressure fluid during the pull-back stroke would pass from the clamping cylinders 48, through the relief valve 51 and lines 52, 53 and 55, back into the surge tank 19, thus preventing the return of the moving parts. This, however, is prevented by the operation of the pipe line 56 leading from the valve cap 72 of the valve 51 to the passageway 47 within the drawing plunger 22. Consequently, during the pull-back stroke pressure is applied simultaneously upon opposite sides of the valve plunger 62 within the relief valve 51, and prevents its opening regardless of how low a clamping pressure is provided by the seting of each relief valve 51. When the platen 36 has moved upwardly along the rods 81 it will engage the nuts 83 and lift the clamping member 42 free from engagement with the work piece 16, thereby enabling the operator to remove the work piece and also lifting the entire platen and blankholder assembly as a unit.

It will be understood that I desire to comprehend within this invention such modifications as come within the scope of the claims and the invention.

Having thus fully described my invention, what I claim as new and desire to secure by Letters Patent is:

1. In combination in a drawing press, a main cylinder, a double-acting drawing plunger therein, a platen operated thereby, a press bed, a work piece support thereon, a plurality of clamping cylinders mounted on said platen and hydraulically connected to said main cylinder, clamping plungers in said clamping cylinders, a clamp attached to said clamping plungers, said clamping cylinders being responsive to the motion of said drawing plunger for generating fluid pressure to actuate said clamping plungers after said clamping plungers have been brought to rest by the engagement of said clamp with the work piece on said work piece support to clamp the work piece during the drawing operation, and an individual pressure relief device associated with each clamping cylinder and adjustable to an individual pressure for discharging fluid from said clamping cylinder in response to the attainment of a predetermined pressure therein, said clamping cylinders being connected with the return side of said drawing plunger for maintaining said clamping plungers in clamping engagement with the work piece during the first part of the return stroke of said drawing plunger, and a plurality of check valves respectively associated with said clamping cylinders for permitting the flow of fluid to said clamping cylinders from the return side of said drawing plunger but adapted to prevent flow of fluid in the opposite direction.

2. In combination in a drawing press, a press bed, a work piece support thereon, a drawing cylinder, a double-acting drawing plunger therein, a platen operated by said drawing plunger, clamping cylinders mounted on said platen, clamping pistons in said clamping cylinders, a clamping member attached to said clamping pistons, said clamping cylinders being responsive to the motion of said drawing plunger for generating fluid pressure to actuate said clamping pistons after said clamping pistons have been brought to rest by the engagement of said clamping member with the work piece on said work piece support, said drawing cylinder and said clamping cylinders being hydraulically interconnected by fluid-conducting means extending from the return side of said drawing cylinder to said clamping cylinders for conveying fluid therebetween, a pressure relief device connected to each clamping cylinder for discharging pressure therefrom in response to the attainment of a predetermined pressure therein, and means connecting said pressure relief devices to the return side of said drawing cylinder for rendering said pressure relief devices inoperative during the return stroke of said drawing plunger.

3. In combination in a drawing press, a press bed, a work piece support thereon, a drawing cylinder, a double-acting drawing plunger therein, a platen operated by said drawing plunger, clamping cylinders mounted on said platen, clamping pistons in said clamping cylinders, a clamping member attached to said clamping pistons, said clamping cylinders being responsive to the motion of said drawing plunger for generating fluid pressure to actuate said clamping pistons after said clamping pistons have been brought to rest by the engagement of said clamping member with the work piece on said work piece support, said drawing cylinder and said clamping cylinders being hydraulically interconnected by fluid-conducting means extending from the return side of said drawing cylinder to said clamping cylinders for conveying fluid therebetween, a pressure relief device connected to each clamping cylinder for discharging pressure therefrom in response to the attainment of a predetermined pressure therein, means connecting said pressure relief devices to the return side of said drawing cylinder for rendering said pressure relief devices inoperative during the return stroke of said drawing plunger, and unidirectional valve means associated with the fluid-conducting means for permitting the flow of fluid to said clamping cylinder from the return side of said drawing plunger but adapted to prevent the flow of fluid in the opposite direction to maintain the clamping action of the clamping plungers during the return stroke of said drawing plungers.

4. In combination in a drawing press, a drawing cylinder, a double-acting drawing plunger therein, a platen operated by said drawing plunger, a plurality of clamping cylinders in said platen, clamping plungers in said clamping cylinders, a clamping member attached to said clamping plungers and adapted to be operated by the relative motion between said clamping cylinders and said clamping plungers, a plurality of pressure relief valves adjustable to different releasing pressures, one pressure relief valve being connected to each clamping cylinder for discharging pressure fluid therefrom in response to the attainment of a predetermined pressure therein, fluid passageways interconnecting said clamping cylinders and the return side of said drawing plunger for conveying fluid to said clamping cylinders to maintain the clamping action of the clamping plungers and hold the clamping members in engagement with the work piece at the start of the return stroke of the drawing plunger, and a plurality of check valves respectively provided in said fluid passageways and associated with said clamping cylinders for permitting the flow of fluid to said clamping cylinders from the return side of said drawing plunger but adapted to prevent flow of fluid in the opposite direction.

5. In combination in a drawing press, a drawing cylinder, a double-acting drawing plunger therein, a platen operated by said drawing plunger, a plurality of clamping cylinders in said platen, clamping plungers in said clamping cylinders, a clamping member attached to said clamping plungers and adapted to be operated by the relative motion between said clamping cylinders and said clamping plungers, a plurality of pressure relief valves adjustable to different releasing pressures, one pressure relief valve being connected to each clamping cylinder for discharging pressure fluid therefrom in response to the attainment of a predetermined pressure therein, fluid passageways interconnecting said clamping cylinders and the return side of said drawing plunger for conveying fluid to said clamping cylinders to maintain the clamping action of the clamping plungers and hold the clamping member in engagement with the work piece at the start of the return stroke of the drawing plunger, and check valves in each of the respective passageways for preventing the flow of fluid from said clamping cylinders to the return side of said drawing plunger.

6. In combination in a drawing press, a main cylinder, a main plunger, a platen operated thereby, a press bed, a work piece support thereon, a plurality of clamping cylinders mounted on said platen, clamping plungers operating therein, a clamp attached to said clamping plungers, said clamping cylinders being hydraulically connected to the return side of said main cylinder whereby to maintain the clamp in engagement with the work piece during the first part of the return stroke of said main plunger, said clamping cylinders being responsive to the motion of said main plunger for generating fluid pressure to actuate said clamping plungers after said clamping plungers have been brought to rest by the engagement of said clamp with the work piece on said work piece support, an adjustable pressure relief valve for each clamping cylinder arranged to discharge pressure fluid individually from each clamping cylinder at a predetermined pressure differing from the discharge pressure in at least one of the other clamping cylinders, and means interconnecting said pressure relief valves with the return side of said main plunger for rendering said pressure relief valves inoperative during the return stroke of said main plunger.

7. In combination in a drawing press, a main cylinder, a main plunger, a platen operated thereby, a press bed, a work piece support thereon, a plurality of clamping cylinders mounted on said platen, clamping plungers operating therein, a clamp attached to said clamping plungers, said clamping cylinders being hydraulically connected to the return side of said main cylinder whereby to maintain the clamp in engagement with the work piece during the first part of the return stroke of said main plunger, said clamping cylinders being responsive to the motion of said main plunger for generating fluid pressure to actuate said clamping plungers after said clamping plungers have been brought to rest by the engagement of said clamp with the work piece on said work piece support, an adjustable pressure relief valve for each clamping cylinder arranged to discharge pressure fluid individually from each clamping cylinder at a predetermined pressure differing from the discharge pressure in at least one of the other clamping cylinders, and a conduit extending from said pressure relief valves to the return side of said main plunger, said pressure relief valves including means for rendering said pressure relief valves inoperative during the return stroke of said main plungers.

8. In combination in a drawing press, a press bed, a work piece support thereon, a drawing cylinder, a double-acting drawing plunger therein, a platen operated by said drawing plunger, clamping cylinders mounted on said platen, clamping pistons in said clamping cylinders, a clamping member attached to said clamping pistons, said clamping cylinders being hydraulically connected to the return side of said drawing cylinder whereby to maintain the clamp in engagement with the work piece during the first part of the return stroke of said drawing plunger, said clamping cylinders being responsive to the motion of said drawing plunger for generating fluid pressure to actuate said clamping pistons after said clamping pistons have been brought to rest by the engagement of said clamping member with the work piece on said work piece support, a pressure relief device connected to each clamping cylinder for discharging pressure therefrom in response to the attainment of a predetermined pressure therein, and means connecting said pressure relief devices to the return side of said drawing cylinder for rendering said pressure relief devices inoperative during the return stroke of said drawing plunger.

9. In combination in a press, a press plunger operable to shape a work piece, a plurality of clamping cylinders movably connected to said press plunger, clamping plungers respectively reciprocable in said cylinders, a clamping member attached to said clamping plungers and operable to engage said work piece and to clamp the same against a support, means for conveying fluid to said clamping cylinders, said clamping cylinders being responsive to the movement of said press plunger toward said work piece, while the latter is engaged by said clamping member, for creating pressure in said clamping cylinders, means responsive to pressure thus created in said clamping cylinders for preventing equalization of pressure in said clamping cylinders, and means respectively connected to said clamping cylinders and adjustable independently of each other for at the same time maintaining predetermined different pressures in at least two clamping cylinders.

10. In combination in a press, a reciprocable press plunger, a platen movable by said press plunger, a plurality of clamping cylinders in said platen, clamping plungers corresponding in number to said clamping cylinders and reciprocable therein, a clamping member attached to said clamping plungers and operable to exert clamping pressure on a work piece to be shaped, to hold the same clamped against a support during the shaping of said work piece, fluid conveying means for conveying fluid to said clamping cylinders, said clamping cylinders being responsive to the movement of said platen toward said clamping member for creating pressure in said clamping cylinders, means responsive to pressure thus created in said clamping cylinders for interrupting hydraulic communication between said fluid conveying means and said clamping cylinders whereby the fluid is entrapped in said clamping cylinders, and individually adjustable pressure relief devices respectively connected to said clamping cylinders but independent of each other for enabling the establishment of different clamping pressures in each individual clamping cylinder, and allowing of the work piece to be clamped with a different pressure at different areas thereof.

11. In combination in a drawing press, a drawing plunger, a platen operatively connected thereto, a work piece support for supporting a work piece to be shaped, a plurality of clamping cylinders mounted on said platen, fluid operable clamping plungers in said clamping cylinders, a clamp attached to said clamping plungers, said clamping cylinders being responsive to the movement of said drawing plunger for generating fluid pressure to actuate said clamping plungers after said clamping plungers have been brought to rest by the engagement of said clamp with a work piece on said work piece support, to clamp the work piece during the drawing operation, and pressure relief devices respectively associated with said clamping cylinders and adjustable independently of each other to an individual pressure for discharging fluid from the respective cylinder in response to the attainment of a predetermined pressure therein.

12. In combination in a press, a reciprocable pressing platen, a plurality of clamping cylinders on said platen, fluid operable clamping plungers operating in said clamping cylinders, a clamping member attached to said clamping plungers for clamping a work piece to be shaped, said clamping cylinders being responsive to the movement of said pressing platen for generating fluid pressure to actuate said clamping plungers after said clamping plungers have been brought to rest by the engagement of said clamping member with the work piece to be shaped, a plurality of pressure relief devices individually adjustable to different releasing pressures, one pressure relief device being connected to each clamping cylinder for discharging pressure fluid individually from each clamping cylinder at a predetermined pressure differing from the discharge pressure in at least one of the other clamping cylinders, and means adapted to make said pressure relief devices ineffective during the return stroke of said pressing platen.

WALTER ERNST.